Feb. 10, 1970    R. C. LE CRAW    3,495,189
BROADBAND MAGNETO-OPTIC GARNET MODULATOR
Filed April 18, 1966
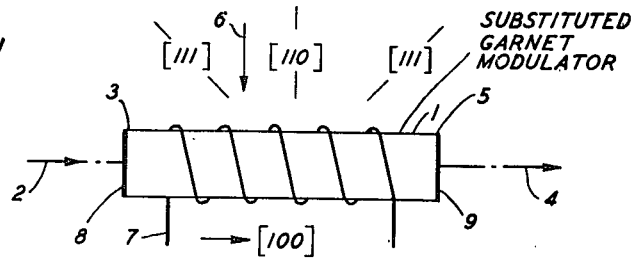
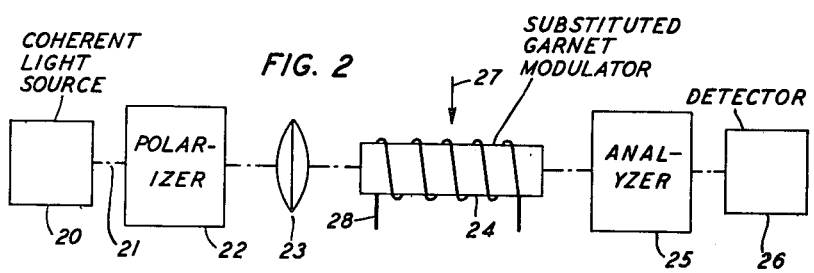
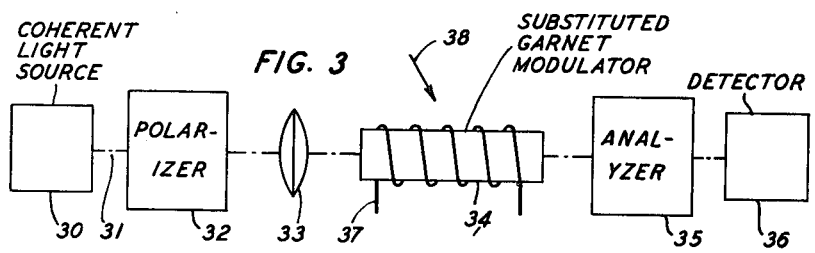
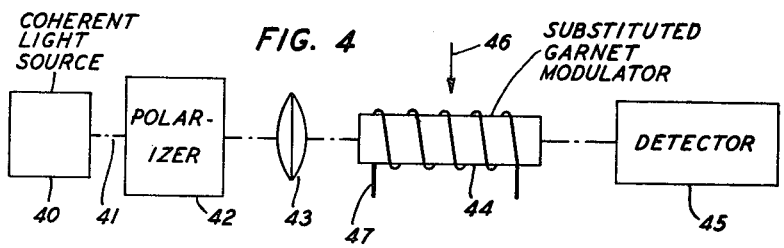
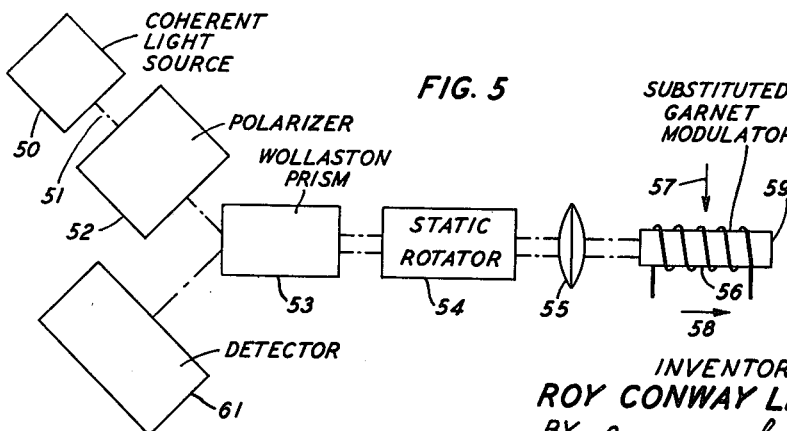
INVENTOR
ROY CONWAY LE CRAW
BY
ATTORNEY

United States Patent Office 3,495,189
Patented Feb. 10, 1970

3,495,189
BROADBAND MAGNETO-OPTIC GARNET MODULATOR
Roy Conway Le Craw, Madison, N.J., assignor to Bell Telephone Laboratories, Incorporated, New York, N.Y., a corporation of New York
Filed Apr. 18, 1966, Ser. No. 543,318
Int. Cl. H03c 1/48
U.S. Cl. 332—51                              18 Claims

ABSTRACT OF THE DISCLOSURE

A broadbend magneto-optic modulator utilizes a single crystal of yttrium-iron garnet or related composition so modified as to reduce the magnetization. The device operates below resonance and is magnetically saturated by means of a DC field applied orthogonally to the light beam direction. An R.F. modulating field applied parallel to the beam rotates the magnetization so as to result in a component along the beam.

---

This invention relates to electromagnetic wave modulators for operation over the wavelength range of from about one to about ten microns and to systems employing such modulators. The modulators of this invention are constructed of iron-containing saturable magnetic garnets.

The invention of the laser, the first coherent light source, less than a decade ago, immediately suggested a number of exciting applications. Many of these have since been demonstrated and some have found their way into commercial use. Among the latter are microscale fabrication techniques, detailed surgery, and Raman spectroscop. However, one of the most exciting uses of all, communications, is still in its infancy.

To the communications engineer, the laser was a much higher frequency and, therefore, a much greater bandwidth carrier. It was early indicated that the new bandwidth so made available was easily capable of carrying all intelligence, sound and video included, being transmitted in the United States. Of course, it was immediately apparent that fruition would require development of modulating and demodulating means. Activity directed to this goal has grown rapidly in intensity. Other uses of optical modulators are of interest. Examples include use in optical delay lines such as the folded line described in 4 Applied Optics 883 (August 1965).

At this time there are many modulating arrangements which have been demonstrated, of which the more important depend on electro-optic or magneto-optic interactions.

For a considerable period of time it appeared that the most practical modulator would utilize an electro-optic interaction probably in a ferroelectric crystal operating in a paraelectric region. An early material suggested for this purpose was KDP (potassium dihydrogen phosphate). KDP was, however, eventually supplanted by other materials which permitted a given degree of modulation with fields smaller than the several thousand volts required in the earlier material. One of the most interesting of the new materials is KTN (a solid solution of potassium tantalate and potassium niobate), which, since it manifests a quadratic dependence of polarization on applied voltage, permits biasing-out to allow modulation with relatively small additional modulating voltages. KTN continues to be a very promising modulating material, but commercial production is still frustrated by an inability to reproducibly grow acceptable crystals.

Magneto-optic modulators have not been pursued as diligently. It has been recognized that effective modulation based on this interaction requires a saturable magnetic material, either ferromagnetic or ferrimagnetic. The number of such materials available with sufficient transparency to permit transmission of light energy to be modulated is limited. Of the materials which have been seriously considered, chromium tribromide, which must be utilized well below its Curie point or about 25° K., is promising, but development is hampered by poor physical qualities which make adequate grinding and polishing very difficult. Other saturable magnetic materials having the requisite transparency have been difficult to produce (e.g., europium oxide) or have impracticably low Curie temperatures (such as the 2° K. transition for gadolinium trichloride).

One of the more significant discoveries in the field of magnetic materials was that of ferrimagnetic yttrium-iron garnet (YIG). It has been evident for several years that this crystalline material has appreciably narrower resonance line width than that of the ferrites and that it is for this reason, and others, adaptable to far more discriminating uses. The fact that this coal-like material evidenced some transparency at the red end of the spectrum did not escape notice, and low frequency light modulators using such light were demonstrated in the late 1950's.

With the recent reinvestigation of the transparency "window" extending into the infrared region in YIG, there has been some revitalization of interest in this material. See Applied Physics Letters, volume 7, page 27, July 1, 1965. The fact that some laser oscillators produce light of a wavelength matched to this transparency region adds further interest. Thus far, however, the choice of wavelength, crystallographic orientation, composition, and other parameters have conspired to limit operation of such modulators to a bandwidth of about 5–10 megacycles.

In accordance with this invention, a garnet light modulator having the capability of operating at far greater bandwidth is described. The conditions which give rise to this improved capability are critical. Like certain other devices which have been suggested in the past, these modulators use iron-containing saturable materials of the garnet structure. However, it is required that some part of the tetravalent iron be replaced by a nonmagnetic material, notably gallium or aluminum. The effect of this substitution is to reduce the saturation moment and so lessen the amount of power required to produce a given degree of modulation. A second requirement pertains to crystallographic orientation. In the basic configuration, light transmission is in the [100] direction with provision for an applied DC magnetic field in the plane defined by the light transmission direction and a [110] direction normal to the light transmission direction. This DC field is so arranged to have a component in this [110] direction and, in an exemplary case, lies entirely along this axis. Orientation in this manner permits a significant increase in frequency response for a given level of power dissipation in the sample.

While all of the devices herein share the characteristics set forth above, certain additional variations are possible and constitute preferred embodiments of this invention. Generally, these include the use of applied fields significantly greater than required to saturate the medium, so permitting increased frequency operation, and various arrangements with other elements so as to permit particularly effective use of the modulator.

Further discussion is expedited by reference to the drawing in which:

FIG. 1 is a front elevational view of a light modulator in accordance with this invention;

FIG. 2 is a schematic representation of a system utilizing an element such as that depicted in FIG. 1;

FIG. 3 is a schematic representation of another such system utilizing an element in accordance with this invention particularly adapted for PCM (pulse code modulation) operation;

FIG. 4 is a schematic representation of yet another such system dependent upon a magneto-optic modulator herein, however adapted for phase modulation or frequency modulation operation; and FIG. 5 is a schematic representation of such a system arranged for two trip traversal of the light beam through the modulator to reduce the required modulating power.

Referring again to FIG. 1, the element shown consists of crystalline body 1 of substituted iron-containing ferrimagnetic garnet. Provision is made for introduction of light beam 2 at surface 3 and for extraction of light beam 4 at surface 5. The orientation of the crystal is such that light transmission is along a [100] crystallographic direction. A direction normal to light transmission, illustratively in the plane of the representation, defines a [110] crystallographic direction. Magnetic means (not shown) is provided for magnetically saturating crystalline body 1. Arrow 6 is intended to depict at least a component of this applied field. Modulation is achieved by introducing a magnetic field component in the light transmission direction. This may be accomplished by passing a current through winding 7 from a source not shown.

It has been indicated that the orientation of the crystal is critical. The anisotropy energy surface in the garnet has a saddle point along the [110] axis. This anisotropy field which resists tilting of the magnetization in a plane normal to the page, effects an increase in the ferromagnetic resonance frequency for any given applied field thereby permitting increased frequency operation. While tilting in this direction is impeded, the existence of easy directions of magnetization [111] in the plane of the page intermediate the orthogonal [100] and [110] directions results in a tendency of the magnetization to tilt in the direction of the light transmission direction.

In operation, crystalline body 1 is magnetically saturated in an illustrative case by a normal magnetic field 6. The field applied may advantageously exceed the value required to saturate, for reasons discussed. For this exemplary mode of operation, a plane polarized light beam 2, polarized parallel or perpendicular to field 6, introduced at surface 3 passes through body 1 unchanged. Introduction of current through winding 7 tilts the magnetization, so resulting in a component in a light transmission direction. The magnitude of this component determines the degree of rotation, or of phase retardation, or of frequency change, depending upon the system. Regardless of the mode of operation, the degree of modulation may be enhanced by use of optional partially reflecting surfaces 8 and 9. The resulting cavitation permits retention of the light beam for a given statistical number of passes during each of which the modulation is increased. Since the power required to increase modulation in a given crystal length for a single pass varies as the square of the degree of modulation, the advantages from this standpoint is significant.

It has been indicated that a crystalline body 1 is composed not of YIG but of substituted YIG. The nature of the substitution is such as to replace nonmagnetic ions for some of the tetrahedrally coordinated iron ions (which, in the unsubstituted material, exceed in number the octahedrally coordianted iron ions and are therefore responsible for the net moment in the garnet). Exemplary partial substitutions are gallium and aluminum with a preference existing for the former, particularly for the higher doping levels. In either case, the minimum substitution is 0.3 atom of nonmagnetic ion per formula unit ($Y_3Fe_5O_{12}$). On the same basis, the maximum substitution for gallium and aluminum is 1.2 atoms and 1.3 atoms, respectively. A preferred range is from 0.8 to 1.1 atoms of either gallium or aluminum on the same basis. The value of these particular substitutions is based on the very strong preference shown by these ions for the tetravalent sites. Substitution by either gallium or aluminum is almost purely tetrahedral at the lower level within the prescribed range. The tetrahedral preference of gallium is, however, stronger than aluminum for heavier doping levels, so resulting in the disparity noted in the broad range maxima for equivalent results. Other such substitutions are of interest. One example is vanadium and this material and its permissible range of inclusion is discussed further on.

Substitution of nonmagnetic ions for the iron ions responsible for the net moment results in a decreasing value of saturation magnetization moment $4\pi M_s$. This value is 1770 gauss for the uncompensated material and only about 270 gauss for the preferred substitution levels noted. For a rod configuration such as that shown in FIG. 1 and for the orientation noted, the normal field required to saturate is approximately one-half the values indicated. It is seen, therefore, that the normal saturating field is reduced by this substitution from a value of 880 oersteds to about 135 oersteds. Since the degree of modulation is always dependent upon the magnitude of the magnetic component in the transmission direction, and since the power required to tilt the saturating field is dependent on the size of the saturating field, reduction of the required saturating field results in a reduction in modulating current.

The minimum quantity of nonmagnetic ion is that necessary to reduce the saturating field to one-half the value for no substitution. The maximum values indicated are those necessary to reduce the applied normal saturating field to about 60 oersteds. There are two basic reasons for not exceeding the maximum values indicated. Substitutions of this type result in a decreasing Curie temperature. The Curie temperature for unsubstituted YIG is 545° K. For one atom of gallium or 1.1 atoms of aluminum, the Curie point is reduced to about 420° K. For the maximum substitutions, this value is about 330° K. Greater substitutions result in increasing temperature sensitivity and are particularly undesirable for room temperature operation. Larger substitutions may, from this standpoint, be permitted for lower temperature operation. Increased amounts of gallium or aluminum are, however, undesirable since they result in significant reduction in specific rotation (or phase change). The specific rotation, 172° per centimeter in the unsubstituted material, is mainly dependent upon the octahedrally coordinated iron and is in consequence reduced only to the extent that the substituted ions replace iron in this coordination. Substitution at the lower levels is largely tetrahedrally preferential so that rotation is reduced only down to about 112° per centimeter for a composition containing one atom of gallium. An additional 0.25 atom of gallium, however, pushes the level down to about 40° or 50° per centimeter, mainly due to the reduction in Curie temperature.

While gallium and aluminum have been found to be the most promising ionic substitutions to date, other elements showing a strong preference for tetrahedral iron are appropriate. One such element is vanadium, which it has been found may be incorporated in amounts of up to 1.5 atoms in the formula indicated. Of course, use of more than one atom of this element results in a situation in which the moment produced by the octahedral iron is predominant. While such large amounts may result in some reduction in specific rotation, they do not result in as large a reduction in Curie temperature associated with the ionic substitutions discussed above. Representative compositions of this nature are discussed in copending U.S. application Ser. No. 293,962, filed July 10, 1963.

Discussion has been in terms of yttrium cations, although some substitution in this site is necessitated by use of the pentavalent vanadium alluded to above. In general, the very large class of rare earth iron garnets are unsuitable for these purposes since the loss mechanisms associated with these cations are significant.

Lutecium iron garnet is, however, known to be equivalent to YIG and is acceptable for use in the light modulators of this invention. Complete or partial substitutions of yttrium by other elements, such as bismuth and calcium, is permitted.

The transparency for YIG and the related compositions described above is generally described in Applied Physics Letters, volume 7, page 27, supra. Transparency ranges from about 1.2 microns to about four microns for room temperature operation. The range is broadened at lower temperature and may be considered to extend from about one micron to about ten microns at liquid nitrogen. Transparency at the high frequency end may be improved by minimizing the divalent iron content, in the manner described in Journal of Applied Physics Supplement, March 1966. Systems utilizing the modulators of this invention must operate in the noted wavelength range. Fortunately, there are several acceptable available laser oscillators. Some of the work reported in this description utilized a helium-neon laser operating at 1.52 microns. In the solid state devices, neodymium-YAG at 1.06 microns and 1.34 microns, thulium-YAG at 1.9 microns, and holmium-YAG at about 1.9 microns are suitable.

The remaining figures illustrate systems useful for communications and other optical systems such as memories using delay lines in accordance with the invention.

The system of FIG. 2 consists of laser coherent light source producing light beam 21, which passes through plane polarizer 22, focusing means 23, substituted iron garnet modulator 24, analyzer 25, and finally into detector 26, in succession. An applied field 27 having a component normal to the light transmission direction, which direction defines a [110] crystallographic axis in common with all modulators of this invention, maintains modulator 24 magnetically saturated. Modulating current, introduced through winding 28, results in rotation of the plane polarized light beam to a degree dependent upon the magnitude of the component of magnetization lying in the transmission direction. In common with other modulation apparatus, the relative polarization directions of elements 22 and 25 depend upon the desired mode of operation. They may be crossed so as to permit no transmission in the absence of a modulating current, or they may be parallel to permit maximum transmission in the absence of modulating current. They may be at some intermediate angle for biased linear CW operation or for one mode of digital operation, which while resulting in some loss, may take advantage of a rotation of less than 90°.

The apparatus of FIG. 3 is virtually identical to that of FIG. 2 and consists of coherent light source 30, producing light beam 31, which is plane polarized by element 32, is focused by element 33, is modulated within element 34, is analyzed in element 35, and finally is detected in element 36. Modulation again results by introduction of current through winding 37. The crystallographic directions within element 34 are again such as to permit transmission of light in a [100] direction, and such as to provide for a [110] axis, these directions together defining the plane within which the saturating magnetic field 38 is applied. In this figure, the field does not coincide with the [110] direction. The arrangement indicated is useful where the degree of modulation, for example, the rotation, is to be maximized in a short crystal. It has been noted that the rotation for the preferred composition is about 112° per centimeter. Starting with the applied saturating field normal to the transmission direction, it may be tilted to a position coinciding with the [111] axis with relative ease, but to a direction more closely approaching the major axis of the crystal, only with difficulty. Attainment of greater than about 45° rotation in a one centimeter length crystal is not easily accomplished for a normally applied field in a traveling wave device. Tilting the field, in the manner indicated in a direction approaching that of a [111] axis, facilitates attainment of a greater maximum degree of modulation. Passage of current through winding 37, in such direction as to produce a field component from left to right, results in tilting of the net field from the position indicated, through the orthogonal position, and finally to that corresponding with a second [111] axis. Since the net field is never caused to approach a hard direction [100], the energy required to accomplish the corresponding degree of modulation is reduced.

The apparatus of FIG. 4 is designed to produce phase or frequency modulation. This apparatus consists of coherent light source 40, producing light beam 41, which is circularly polarized upon passing through a quarter wavelength plate of birefringent material 42. Upon leaving the circularly polarizing element 42, beam 41 is again caused to pass through focusing means 43, modulating element of substituted iron garnet 44, and is finally collected at detector 45. Again, a saturating field, denoted as arrow 46, but which may be applied in any direction in the described plane as to result in a normal component, is required. Passage of current through winding 47 produces only retardation or acceleration of the now circularly polarized beam with the degree of change again dependent upon the magnitude of the magnetization component lying in the light transmission direction. The system is completed by detector 45 which may be arranged to be sensitive to this phase shift or to the corresponding frequency change.

FIG. 5 illustrates a two-pass system which accomplishes a given degree of rotation with one-quarter the power required for a single-pass system using the same length modulator. The system consists of coherent light source 50, producing beam 51, which passes through plane polarizer 52, and thence into Wollaston prism 53. The beam is bent by the prism, in the manner indicated, and is so caused to pass through a static 22.5° rotator 54. Upon leaving rotator 54, the beam passes through focusing means 55 and into modulator 56, which is constructed of substituted garnet in a manner consistent with the other devices of this invention. Application of a DC magnetic field 57, together with a modulating field 58, conspire to produce a given degree of rotation over the length of crystalline body 56. The modulator is, however, provided with a reflecting end 59 so that the beam is caused to retraverse the crystalline element 56, over which traversal an equal degree of modulation is added. Beam 51, now on the return trip, again passes through focusing means 55 and through 45° rotator 54. Upon reaching Wollaston prism 53, the beam is now rotated a total of 90° by element 54 so that emergence is at the angle characteristic of such orthogonally polarized beam, resulting in detection by detector 61. In operation for the arrangement depicted, maximum amplitude is detected at element 61 for no applied modulation in element 56. Any rotation introduced at modulator 56 lessens the amount of energy polarized at the appropriate angle to emerge from prism 53 in a direction such as to be collected by analyzer 61. Of course, the arrangement of FIG. 5, like all of the other figures, is merely illustrative. Specifically, two-trip modulators may utilize DC field-biased element 56 in lieu of static rotator 54. Biasing may be such as to again permit maximum amplitude at detector 61 in the unmodulated state, or minimum amplitude in the unmodulated state, or one-half amplitude.

The apparatus depicted in FIGS. 2 through 5 may be modified in other ways. For example, while operation is described largely in terms of traveling wave devices, the ends of the garnet modulators may be made partially reflecting as described for FIG. 1, resulting in a Fabry-Perot cavitation, so enhancing the degree of modulation obtainable for any given level of modulating current.

Modulators of the type described have been operated to yield expected results. Using the preferred gallium-doped composition with an applied field of 232 oersteds, 200 megacycle bandwidth CW modulation at 20 percent depth was achieved for single trip with a modulating power of 86 milliwatts for one centimeter length crystal at room temperature. Use of a 460 oersted field on the same configuration permits approximately 500 megacycle bandwidth operation for a modulating power of about 350 milliwatts in the traveling wave device.

The invention has been described in terms of a limited number of specific embodiments. Deviation may be made from the specific illustrations without departing from the scope of the inventive teaching. For example, systems have been described largely in terms of communications whereas other system uses are known and may make advantageous use of the modulators of this invention. One such use, in conjunction with a folded optical delay line in a memory has been mentioned and is considered to be of particular interest. For this use there is no need for the analyzer described in many of the figures, and elements such as numbers 35 and 45 may be considered to represent such folded optical delay lines.

What is claimed is:

1. A modulating consisting essentially of a single crystal of an iron-containing ferrimagnetic garnet composition in which the saturation moment is reduced by substitution of at least 0.3 ion of a nonmagnetic element for each five iron ions, with means for transmitting coherent electromagnetic radiation in a direction essentially corresponding with a [100] direction, and means for applying a magnetic field at least sufficient to saturate the said crystal, the said field having a component orthogonal to the said transmission direction, which orthogonal direction essentially corresponds with a [110] crystallographic direction and in which the said field essentially lies in the plane defined by the said [100] and [110] directions together with means for tilting the applied saturating field so as to produce a variation in magnetization in the direction of light transmission.

2. Device of claim 1 in which the said nonmagnetic ion is at least one ion selected from the group consisting of gallium and aluminum, and in which the maximum inclusion of such nonmagnetic ion is 1.2 ions gallium and 1.3 ions aluminum.

3. Device of claim 2 in which the nonmagnetic ion substitution is in the range of from 0.8 to 1.1.

4. Device of claim 1 in which at least one surface of the said crystal in the direction of light transmission is at least partially reflecting.

5. Device of claim 4 in which both surfaces of the said crystal defining the direction of light transmission are partially reflecting.

6. Device of claim 1 together with means for introducing a beam of coherent electromagnetic radiation within the bandwidth range of from one micron to ten microns into the said crystal.

7. Device of claim 6 in which the said coherent radiation is plane polarized.

8. Device of claim 6 in which the said coherent radiation is circularly polarized.

9. Device of claim 1 together with means for detecting the polarization of the exiting beam.

10. Device of claim 9 in which the said detecting means includes a plane polarizer.

11. Device of claim 1 together with means for introducing a polarized coherent light beam within the wavelength range of from one micron to 4.2 microns, means for introducing a component of magnetization within the said crystal in the direction of light transmission, and means for analyzing the exiting beam.

12. Apparatus of claim 11 in which the said polarized beam is plane polarized and in which the analyzing means includes a polarizing medium.

13. Apparatus of claim 12 in which the said polarizing medium is a plane polarizer at 45° to the plane of polarization of the polarized beam initially introduced.

14. Apparatus of claim 12 in which the said polarizing medium is a plane polarizer at 90° to the plane of polarization of the polarized beam initially introduced.

15. Apparatus of claim 11 in which the said beam is circularly polarized and in which the said analyzing means is phase sensitive.

16. Apparatus of claim 11 in which the said beam is circularly polarized and in which the said analyzing means is frequency sensitive.

17. Apparatus of claim 11 in which the saturating field is oblique to the transmission direction, and in which means is made for introducing a modulating current sufficient to tilt the said saturating field through and beyond such perpendicular position.

18. Apparatus of claim 11 in which the said crystal is reflecting at the surface in the transmission direction removed from the surface upon which the beam is incident, and in which the exiting beam is separated from the input beam by a Wollaston prism.

References Cited

UNITED STATES PATENTS

| | | | |
|---|---|---|---|
| 3,003,966 | 10/1961 | Van Uitert | 252—62.57 |
| 3,204,104 | 8/1965 | Baird et al. | 332—51 X |
| 3,239,671 | 3/1966 | Buhrer | 250—199 |
| 3,265,977 | 8/1966 | Wolff | 330—4.3 |
| 3,267,804 | 8/1966 | Dillon | 330—4.3 X |
| 3,368,861 | 2/1968 | Rubinstein et al. | 250—199 X |

OTHER REFERENCES

Albert et al.: "Light Modulator," IBM Technical Disclosure Bulletin, vol. 8, No. 2, p. 281, July 1965.

ALFRED L. BRODY, Primary Examiner

U.S. Cl. X.R.

250—199; 252—62.57, 62.58; 331—94.5; 332—7.51; 350—151, 160